Patented Aug. 25, 1953

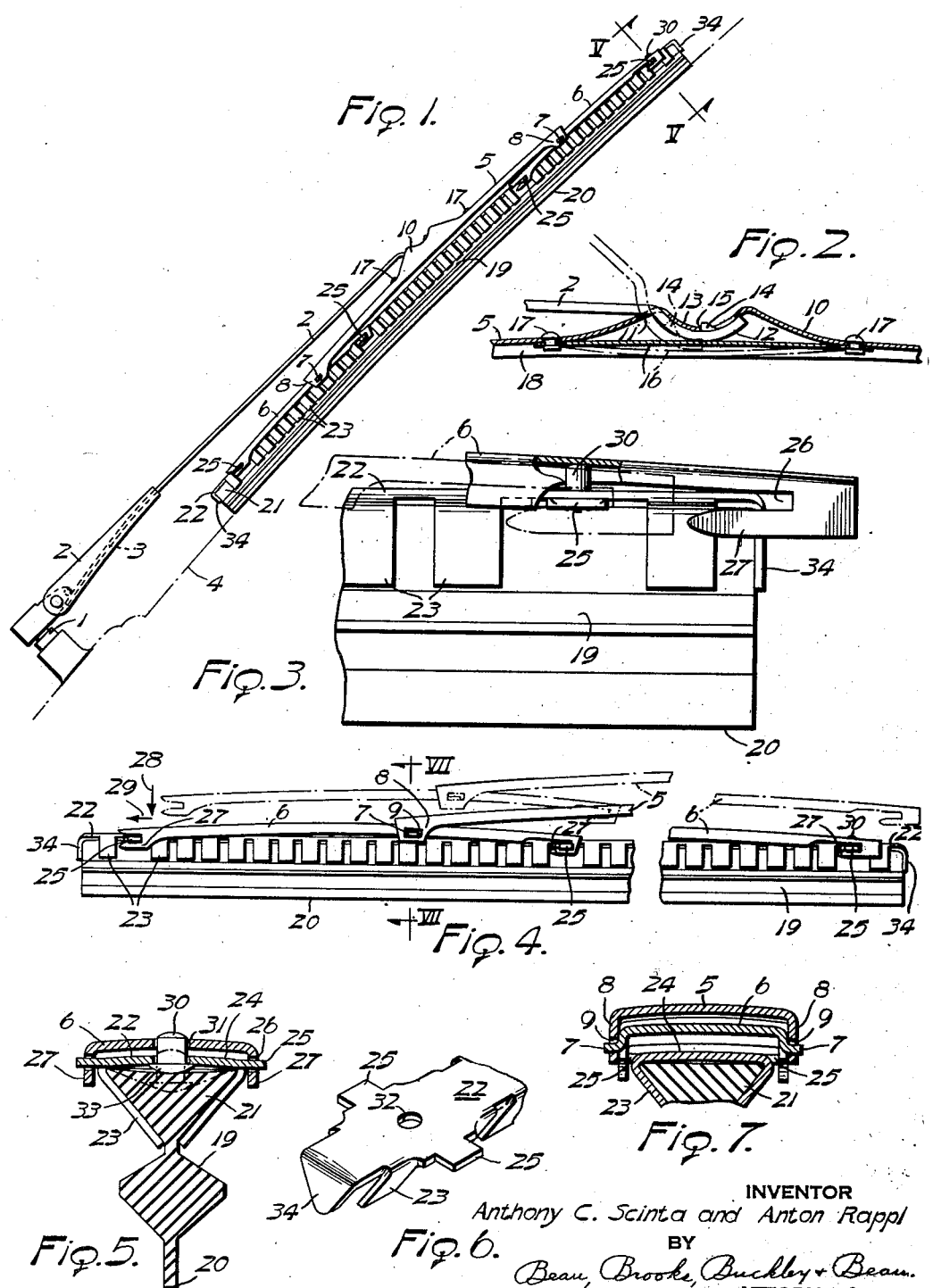

2,649,605

UNITED STATES PATENT OFFICE 2,649,605

WINDSHIELD CLEANER

Anthony C. Scinta, Buffalo, and Anton Rappl, Eggertsville, N. Y., assignors to Trico Products Corporation, Buffalo, N. Y.

Application May 12, 1947, Serial No. 747,374

8 Claims. (Cl. 15—245)

1

This invention relates to the windshield cleaning art and has particular reference to a wiper which will readily conform itself to curved surfaces as well as planar surfaces.

In our earlier application filed March 22, 1947, under Serial No. 736,492, we disclosed and claimed a flexible wiper unit in which a pressure distributing frame or holder served to distribute the spring urge of the usual wiper carrying arm throughout the length of the flexible wiping element to insure substantially uniform pressure in the wiping contact on the windshield.

The present invention is an improvement on this earlier disclosure and it has for an object to provide a compact cleaner construction wherein the pressure distributing holder is brought down upon the squeegee or wiper unit to provide a low-sitting wiping structure that will more effectively resist the lifting action of the wind currents flowing over and across the windshield.

The invention further resides in an improved windshield cleaner in which the wiper unit is readily and detachably interlocked to the pressure distributing holder at its several and relatively movable points of support. Again, the invention has for its aim to simplify the construction so as to make it practical in use and at the same time to render it economical in production.

The foregoing and other objects will manifest themselves as the following description progresses, reference being had to the accompanying drawing, wherein Fig. 1 is a side elevation showing the improved wiper as operatively applied to a curved windshield surface;

Fig. 2 is an enlarged longitudinal sectional view depicting the manner of coupling the wiper to its actuating arm;

Figs. 3 and 4 are fragmentary views in side elevation, with parts broken away, illustrating the mode of attaching the squeegee unit to its pressure distributing holder;

Fig. 5 is a transverse sectional view through the interlock retaining latch, as viewed about on line V—V of Fig. 1;

Fig. 6 is a fragmentary perspective view of the latch end of the unit backing; and Fig. 7 is a transverse sectional view about on line VII—VII of Fig. 4.

Referring more particularly to the drawing, the numeral 1 designates an oscillatory drive shaft of the windshield cleaner mechanism on the outer end of which is mounted the wiper carrying arm 2 which includes a flat spring 3 acting to urge the outer end of the arm toward

2 the windshield surface 4 for applying the wiping pressure to the wiper.

The wiper comprises a holder unit and a squeegee or wiper unit, with means removably interlocking the two units together so as to permit replacement of either unit when conditions so require.

The holder unit is in the form of a flexible linkage or frame and comprises a primary yoke 5 and a plurality of secondary yokes 6 pivotally and loosely connected to the opposite ends of the primary yoke by pivots 7. In the embodiment illustrated the primary yoke is conveniently stamped from sheet metal to provide squeegee straddling ears 8, these ears being formed with apertures 9 to receive the laterally extending pivots 7 of the secondary yokes 6. The secondary yokes are therefore loosely joined to the opposite ends of the primary yoke, and in the illustrated embodiment they are pivotally connected off center with the pivots 7 being located closer to the inner ends of the secondary yokes. This construction will provide a differential leverage by which greater pressure will be applied to the inner extremities of the secondary yokes, although it is to be understood that the secondary yokes may be reversed so that their longer arms will extend inwardly as illustrated in our aforesaid application. Furthermore, it will be noted that by stamping out the primary yoke into a channel formation the inner ends of the secondary yokes will nest within the primary channel more or less fully, as shown in Figs. 1 and 7. Again, the secondary yokes are preferably stamped from sheet metal to provide longitudinally aligned channels for nestingly receiving the squeegee unit. The several yokes are generally of similar arcuate shape, and the channels of the secondary yokes open through their inner or adjacent ends so that when the latter nest into the primary channel the several channels will compose one continuous channel or recess throughout the length of the holder for nestingly receiving the back portion of the squeegee unit. This nesting arrangement provides for compactness and reduces the overall dimension from the wiping edge to the point of arm attachment.

In forming the primary yoke the mid-portion is pressed outwardly to form a hood-like arm attaching clip 10 apertured at 11 to receive the curved tongue 12 at the outer end of the wiper arm. The outer wall 13 of the hood or clip is given an arcuate formation to nestingly receive the tongue 12 where it will be operatively retained by a keeper lug 14 engaging behind a shoulder 15. This interlocking engagement is resiliently maintained by a flat spring 16 which has its opposite ends fixed, as by rivets 17, in the channel 18 of the primary yoke 5. There is sufficient give in the parts to permit the retaining lug 14 to ride over the shoulder 15 when attaching the wiper to its actuating arm.

The squeegee unit comprises a rubber-like body 19 having a wiping edge 20 along one margin and an anchoring bead 21 along its opposite margin. The anchoring bead is embraced by a flexible backing strip 22 which has oppositely extending rows of marginal fingers 23 that clampingly grip upon the side faces of the anchoring bead. This backing strip is formed from light metal stock having slight inherent resiliency, and in order to accord a small degree of rigidity to the strip the same is provided with a transversely crowned formation, as indicated at 24. At properly spaced points throughout the length of the squeegee unit the backing strip is formed with oppositely extending lugs 25 for interlocking with the opposite end portions of the secondary yokes 6. For this purpose such opposite ends of the secondary yokes have side wall extensions straddling the back of the squeegee unit and formed with seats 26 as defined by the underlying hooks or catches 27. These seats when engaged with the lugs 25 hold the back portion of the squeegee unit up within the channels of the secondary yokes at such points of attachment. Consequently, when the open adjacent inner ends of the secondary yokes nest into the primary channel, the channel of the primary yoke, the medial portion of the squeegee unit will be supported in a position for flexing into such primary channel. Preferably the seats open in a common direction lengthwise of the wiper. Consequently the several lugs, four in number on each side of the squeegee unit in the illustrated embodiment, may be simultaneously engaged in their seats and with their catches by and upon relatively longitudinal movement between the squeegee unit and its holder unit. This step of assembly is diagrammatically depicted in Fig. 4 by the arrows 28 and 29, the procedure being initially to bring the holder unit down onto the back of the squeegee unit in a slightly offset relation, as indicated by the arrow 28, and thereafter shifting the holder unit with respect to the squeegee unit in the direction of the arrow 29 for bringing the catches 27 beneath the squeegee lugs 25. This interlocked relationship is maintained by a suitable latch, such as the pin 30 on one unit engaging a recess 31 in the companion unit. As illustrated, the pin may be pressed upwardly through a hole 32 in the backing strip prior to placing the latter on the squeegee body 19. The rubber-like material will thus serve as a spring support for the pin which has its head 33 confined between the anchoring bead 21 and the backing strip. The keeper recess 31 is formed in the outer end of one of the secondary yokes which end portion may have a slight incline to depress the latch pin as the yoke member is slid over the squeegee unit when interlocking the two units together, and when the recess 31 is brought into registration with the latch pin it will be projected by the resilient bead 21.

By reason of the simplified arrangement just described, the flexible holder unit may readily be disengaged from the squeegee unit by simply depressing the latch pin 30 to disengage it from its recess 31 and thereafter shifting the squeegee unit lengthwise to remove the lugs 25 from their seats 26. The lugs 25 as well as the pivots 7 are shown as being rectangular in cross section for sturdiness. Sufficient play will be provided in such instance to permit relative pivotal movement between the connected parts for enabling ready conformance to the wiping edge to the contour of the surface being wiped. The rubbery or squeegee body 19 is held against endwise displacement from the gripping fingers 23 of the backing strip 22 by the downturned stops 34. While the squeegee body may be displaced by springing one of the stops 34 out of its path and then withdrawing the squeegee lengthwise, the displacement may be more readily effected by simply compressing the rubber body lengthwise sufficiently to enable its adjacent end being pulled out through the gap, as provided in the longitudinal series of clamping fingers 23 by the out-turning of the lugs 25, and then withdrawing the body from its backing. This gap provides an entranceway of sufficient dimension to permit the rubber body being passed therethrough for placement and displacement. With the end of the body flexed downwardly through the gap beneath the lugs 25, the body may be pulled easily to the right, as viewed in Fig. 3. For replacement the body would be passed upwardly into the entranceway and then moved to the left until the free end of the rubber is compressed sufficiently to fully enter the channel, as provided by the clamping fingers, whereupon the released rubber will expand substantially to the position depicted.

While the foregoing description has been given in detail it is without thought of limitation since the inventive principles involved are capable of assuming other physical embodiments without departing from the spirit of the invention and the scope of the appended claims.

What is claimed is:

1. A windshield cleaner comprising a flexible squeegee unit conformable to the surface being wiped, a pressure distributing holder having relatively movable parts engaged with the squeegee unit for distributing an arm applied pressure to said unit, said holder comprising a primary yoke and plural secondary yokes rockably mounted at spaced points on the primary yoke, and latch means carried in part by a secondary yoke and detachably coupling the squeegee unit to the secondary yokes by and upon relative movement between the holder and the squeegee unit in a direction lengthwise of the unit.

2. A windshield cleaner comprising a flexible squeegee unit conformable to the surface being wiped, a pressure distributing holder having relatively movable parts engaged with the squeegee unit for distributing an arm applied pressure to said unit, said holder comprising a primary yoke and plural secondary yokes pivotally mounted on the opposite ends of the primary yoke, means detachably coupling the squeegee unit to the opposite ends of the secondary yokes by and upon relative movement between the holder and the squeegee unit in a direction lengthwise of the unit, and latch means operable to secure the holder to the unit against separation during such relative movement.

3. A windshield cleaner comprising a holder unit having a primary yoke to the opposite ends of which are rockably connected plural secondary yokes which latter extend in opposite directions from their points of connection to the primary yoke, the opposite ends of the secondary yokes having longitudinally extending seats with side walls for straddling a squeegee unit, and a squeegee unit having parts removably interlocked in the straddling side walls of the seats, the inner ends of the secondary yokes being spaced apart to define a medial portion of the squeegee unit, said inner ends being nestable against the underside of the primary yoke to dispose the medial portion of the squeegee unit adjacent the primary yoke for supporting contact therewith when so nested.

4. A windshield cleaner comprising a holder unit having a primary yoke to the opposite ends of which are movably connected plural secondary yokes which latter extend in opposite directions from their points of connection to the primary yoke, the opposite ends of the secondary yokes being formed with hook-shaped catches, and a squeeege unit having parts engaged by said catches to hold the squeegee unit in place on the holder unit.

5. A windshield cleaner comprising a holder unit having a primary yoke to the opposite ends of which are movably connected plural secondary yokes which latter extend in opposite directions from their points of connection to the primary yoke, a squeegee unit having oppositely extending parts in longitudinally spaced arrangement, the opposite ends of the secondary yokes having hook-shaped catches straddling the squeegee unit and engaging said parts.

6. A windshield cleaner comprising a holder unit having a channeled primary yoke, and channeled secondary yokes pivotally connected between their ends to the opposite ends of the primary yoke, the adjacent inner end portions of the secondary yokes being nestingly guided in the channel of the primary yoke, with pairs of opposed seats being formed on the opposite ends of each secondary yoke for detachably receiving a squeegee therebetween.

7. A windshield cleaner comprising a flexible squeegee unit conformable to the surface being wiped, a pressure distributing holder unit having a primary yoke and plural secondary yokes pivotally mounted on the opposite ends of the primary yoke, and means detachably coupling the squeegee unit to the opposite ends of the secondary yokes by and upon relative movement between the holder unit and the squeegee unit in a direction lengthwise of the latter, one of said units having a latch part arranged in the path of movement of the other unit for engaging a keeper part on the latter during such longitudinal engagement to lock the two units together.

8. A windshield cleaner comprising a flexible squeegee member conformable to a surface to be wiped, said member having a back portion and a wiping edge narrower than said back portion, a pressure distributing holder comprising a primary yoke of channel form in cross-section including spaced side walls and a base, connecting means on the base of the channel and medially thereof for securing an actuating arm to said yoke, plural secondary yokes of channel form in cross-section having spaced side walls pivotally mounted between the side walls of the primary yoke and at the opposite ends thereof, said channeled secondary yokes being of less width than the primary yoke and of greater width than said back portion of said squeegee member, the inner ends of said secondary yokes being movable with respect to said primary yoke and capable of moving into and out of nesting relation with said primary yoke, said yokes jointly, when nested, forming a continuous substantially unobstructed recess of channel form throughout the length of the holder sufficient to permit the medial back portion of said squeegee member to move into and out of nesting relation with each of said yokes, and backing means for said squeegee member having portions which extend laterally beyond the side walls of said secondary yokes, the inner and outer ends of the side walls of said secondary yokes having depending hook portions formed integrally therewith which directly and slidably engage said laterally extending portions of said backing means.

ANTHONY C. SCINTA.
ANTON RAPPL.

References Cited in the file of this patent

UNITED STATES PATENTS

| Number | Name | Date |
|---|---|---|
| 1,510,509 | Stadeker | Oct. 7, 1924 |
| 1,953,635 | Rose | Apr. 3, 1934 |
| 2,196,542 | Zaiger | Apr. 9, 1940 |
| 2,252,510 | Horton | Aug. 12, 1941 |
| 2,303,694 | Horton | Dec. 1, 1942 |
| 2,376,098 | Steccone | May 15, 1945 |

FOREIGN PATENTS

| Number | Country | Date |
|---|---|---|
| 427,383 | Great Britain | Apr. 23, 1935 |
| 820,156 | France | July 26, 1937 |

OTHER REFERENCES

Publication Anderson Co. "Windshield Wipers," page 2, November 1, 1946. (Copy in Div. 27.)